United States Patent [19]

Arbel et al.

[11] Patent Number: 5,276,731
[45] Date of Patent: Jan. 4, 1994

[54] METHOD AND APPARATUS FOR HANDLING INCOMING TELEPHONE CALLS

[75] Inventors: Ygal Arbel, Sunnyvale, Calif.; Timothy L. Wilson, Austin, Tex.; Gordon Ford, Round Rock, Tex.; Cathy Arledge; Tracy L. Rust, both of Austin, Tex.

[73] Assignee: ROLM Company, Santa Clara, Calif.

[21] Appl. No.: 692,081

[22] Filed: Apr. 26, 1991

[51] Int. Cl.⁵ .................. H04M 1/66; H04M 3/42; H04M 11/00
[52] U.S. Cl. .................. 379/88; 379/100; 379/142; 379/199; 379/201; 379/211
[58] Field of Search .......... 379/88, 89, 67, 142, 379/201, 213, 127, 214, 211, 100, 199, 189, 188

[56] References Cited

U.S. PATENT DOCUMENTS

| | | | |
|---|---|---|---|
| 4,879,743 | 11/1989 | Burke et al. | 379/142 |
| 4,918,322 | 4/1990 | Winter et al. | 379/88 |
| 4,935,954 | 6/1990 | Thompson et al. | 379/89 |
| 4,942,598 | 7/1990 | Davis | 379/57 |
| 4,975,896 | 12/1990 | D'Agosto et al. | 369/29 |
| 4,996,704 | 2/1991 | Brunson | 379/67 |
| 4,996,707 | 2/1991 | O'Malley et al. | 379/100 |
| 4,998,248 | 3/1991 | Matsuzaki | 370/110.1 |
| 5,018,191 | 5/1991 | Catron et al. | 379/100 |
| 5,095,505 | 3/1992 | Finucasse et al. | 379/201 |
| 5,109,405 | 4/1992 | Morganstein | 379/89 |

FOREIGN PATENT DOCUMENTS 0248057 12/1985 Japan .................. 379/100

OTHER PUBLICATIONS

"Beyond ISDN Theory", Andrew Waite, Inbound-/Outbound Magazine, Dec. 1989, pp. 20-22, 24 and 27.
The New York Times; "Opening Nation's Phone Networks", E. L. Andrews; Jan. 16, 1991; p. D5.

Primary Examiner—Thomas W. Brown
Attorney, Agent, or Firm—Michael B. Einschlag

[57] ABSTRACT

Method and apparatus for handling incoming telephone calls and, in particular: (a) for delivering predetermined messages to predetermined calling parties; (b) predetermined, prioritorized screening of incoming telephone calls; and (c) for re-routing incoming telephone calls on the basis of predetermined selection criteria. The predetermined selection criteria include information such as the calling parties, call origination information, call origination information with wildcards, time, date, or a combination of these factors. Call origination information includes, but is not limited to, Automatic Number Identification ("ANI"), private network tie line identification, trunk ID, Wide Area Telephone Service ("WATS"), and extension numbers.

18 Claims, 2 Drawing Sheets

METHOD AND APPARATUS FOR HANDLING INCOMING TELEPHONE CALLS

TECHNICAL FIELD OF THE INVENTION

The present invention pertains to method and apparatus for handling incoming telephone calls and, in particular, for: (a) delivering predetermined messages to predetermined calling parties; (b) predetermined, prioritized screening of incoming telephone calls; and (c) rerouting incoming telephone calls on the basis of predetermined selection criteria.

BACKGROUND OF THE INVENTION

There is a need in the art for handling incoming telephone calls automatically. This need arises in several contexts: (a) delivering predetermined messages to predetermined calling parties; (b) predetermined, prioritized screening of incoming telephone calls; and (c) rerouting incoming telephone calls on the basis of predetermined selection. These needs can be understood as follows.

I. Delivering Messages to Calling Parties

It is well known that there is a need to provide messages to calling parties. At present, this need is filled by one or more of the following methods: (a) providing a greeting to calling parties by, for example, means of an answering machine; (b) providing predetermined, personalized greetings to calling parties by, for example, means of several answering machines attached to several telephone extensions; (c) providing a greeting to calling parties by means of a store and forward messaging system; (d) providing a greeting to calling parties by means of a station messaging capability; and (e) providing personalized messages to calling parties by routing incoming telephone calls to a secretary. These prior art methods have several drawbacks. In general, these prior art methods suffer from the drawbacks that: (a) they do not provide control to the called party; (b) they do not automate the process of delivering personalized messages; and (c) they do not provide security and confidentiality and, as a result, personalized messages may be transmitted to unintended calling parties.

In particular, the first prior method, i.e., providing a general message such as, for example, a general message that is generated by an answering machine greeting, has a drawback in that the same greeting is provided to all incoming calls and the method does not provide the capability of delivering specific information to predetermined calling parties. The second prior art method, in essence an enhancement of the first method, entails providing additional extensions for a called party where each extension utilizes a separate answering machine greeting. Although this second method narrows the intended audience for each greeting since the extension number may be shared with a selected number of callers, the method has a drawback in that a calling party may still use a particular extension number when the greeting provided thereby is no longer intended for the calling party. The third prior art method, i.e., utilizing a voice messaging product such as, for example, a ROLM ™ Systems Phonemail ™ voice messaging system provided by ROLM Systems of Santa Clara, Calif., to record and deliver a personalized message to incoming calls, has a drawback in that a calling party does not have unattended message acceptance. In addition, there may be instances when the called party wants the calling party recipient to receive the information only if the called party calls, as opposed to the called party leaving a message for the calling party. The same capabilities and constraints hold true for text message delivery through electronic mail products. Although the ROLM Systems Phonemail voice messaging system can provide a different message to incoming calls from calling parties external to a private business exchange ("PBX") as opposed to incoming calls from calling parties internal to the PBX, this prior art method still suffers from a drawback in that the personalized greeting is only broken down into two, large and unknown, audiences. The fourth prior art method, i.e., utilizing station messaging which provides the capability of exchanging text messages between telephony devices with displays, has a drawback that a message is not personalized. For example, if Skylar calls Peter and Peter does not answer, then Skylar may send a text message to Peter that says, "Call Skylar King x5454." However, assume that Skylar is out of the office when Peter returns his call and that Skylar has left a station message, "Out for the day," on his terminal which will be provided to any display telephone user that calls. As one can readily appreciate, this last message was not personalized for Peter. The fifth prior method, utilizing the intervening services of a secretary or other third party, has a drawback that it lacks automation in that it requires the availability and cooperation of a third party.

II. Prioritized Screening of Incoming Telephone Calls

It is well known that there is a need to prioritize incoming telephone calls. At present, this need is filled by one or more of the following methods: (a) displaying the name of a calling party for visual recognition; (b) blocking all incoming telephone calls such as, for example, by providing a "Do Not Disturb" function; (c) routing all incoming telephone calls through a secretary for manual prioritization; (d) forwarding incoming telephone calls to a message center or to an answering machine; and (e) providing a multiplicity of telephone extensions. These prior art methods have several drawbacks. In general, these prior art methods suffer from the drawbacks that: (a) they do not provide control to the called party; (b) they do not automate the prioritization process; and (c) they require called party interaction.

In particular, the first prior method, i.e., providing a display of calling party name, has at least two drawbacks. First, the ringing telephone interrupts a called party and, second, the called party must view the display of calling party name to determine whether or not to accept the call. The second prior art method, i.e., blocking all incoming telephone calls such as, for example, by providing a "Do Not Disturb" function, has a drawback in that it does not allow the called party to receive an expected call or permit other priority incoming telephone calls to ring through. The third prior art method, i.e., forwarding all calls to another party, such as a secretary, with instructions for manual prioritization such as, for example, "Hold all calls except those from Jane," has a drawback ——notwithstanding that it provides the ability to accept priority calls and block all others——in that it requires interaction from the secretary. The fourth prior art method, i.e., forwarding all calls to a message center or to an answering device, has a drawback in that the called party will not receive an expected telephone call or and other priority calls will not ring through. As a result, the called party is required to review messages to determine whether a particular incoming telephone call was received. The fifth prior art method, i.e., adding additional lines and providing access numbers for those lines to predetermined parties, has a drawback——notwithstanding that the called party knows, to some extent, who is calling on the "private lines"——in that the called party cannot permit priority calls to ring through. Further, the called party cannot require calling parties to forget a telephone number when they are no longer priority callers.

III. Re-routing of Incoming Telephone Calls

It is well known that there is a need to route calling parties to a predetermined person or voice message system to make most effective use of available resources. At present, this need is filled by one or more of the following methods: (a) call forwarding; (b) providing a descriptive voice message greeting or a voice response unit ("VRU") to help a calling party re-route a call manually; (c) providing re-routing by interaction with a secretary or other third party; (d) requiring a calling party to make additional call attempts; (e) requiring a calling party to have the called party paged; and (f) utilizing hunt groups. These prior art methods have several drawbacks. In general, these prior art methods suffer from the drawbacks that: (a) they do not provide control to the called party; (b) they do not automate the process for the calling and the called party, i.e., a calling party must call different telephone lines to obtain access to different people; and (c) the re-routing is not based on the origin or location of calling parties.

In particular, the first prior art method, i.e., call forwarding, has a drawback in that all incoming telephone calls are forwarded to a single target destination, which target destination typically provides message-taking services only. In the second prior art method, i.e., providing a descriptive voice message greeting or a VRU, is used to describe options for a calling party such as, for example, "Press one to talk with someone in Accounting or dial extension 5353, press two to talk with ...," and so forth. This method provides options to the caller but has a drawback in that it requires action on the part of the calling party. The third prior art method, i.e., wherein a secretary, an operator, or other third party interacts with a calling party to connect the calling party with an appropriate destination, has a drawback in that the method lacks automation. The fourth prior art method, i.e., wherein an calling party continues to make unsuccessful calls in an attempt to reach a particular person, is inferior because it frustrates and consumes the time of the calling party. The fifth prior method, i.e., wherein a calling party has a called party paged, has a drawback in that it is inefficient, lacks automation, and is disruptive to others. The sixth prior art method, i.e., using a hunt group, is useful for transferring an incoming telephone call to a person meeting certain criteria, for example, the first available person that can take an order. However, this method has a drawback in that a hunt group does not provide the capability to transfer a specific call to a predetermined target. In addition, hunt groups are generally established at a system level and are not personally configurable by individual called parties.

As a result of the above, there is a need for method and apparatus: (a) for delivering predetermined messages to predetermined calling parties; (b) for predetermined, prioritorized screening of incoming telephone calls; and (c) for re-routing incoming telephone calls on the basis of predetermined selection criteria. For example, there is a need for method and apparatus for providing these functions on the basis of factors such as: call origination information, time, date, or a combination of these factors.

SUMMARY OF THE INVENTION

Embodiments of the present invention advantageously satisfy the above-identified need in the art and provide method and apparatus for handling incoming telephone calls and, in particular: (a) for delivering predetermined messages to predetermined calling parties; (b) predetermined, prioritorized screening of incoming telephone calls; and (c) for re-routing incoming telephone calls on the basis of predetermined selection criteria.

Embodiments of a first aspect of the present invention advantageously satisfy the above-identified need in the art and provide method and apparatus for delivering predetermined messages to incoming telephone calls, i.e., a called party can create predetermined messages to be delivered automatically to calling parties based on information such as, for example, the calling parties, call origination information, call origination information with wildcards, time, date, or a combination of these factors. Call origination information includes, but is not limited to, Automatic Number Identification ("ANI"), private network tie line identification, trunk ID, Wide Area Telephone Service ("WATS"), and extension numbers. In using the inventive method or apparatus, the called party composes a message and selects call origination information for use in selecting calling parties who may receive the message.

Embodiments of a second aspect of the present invention advantageously satisfy the above-identified need in the art and provide method and apparatus for providing predetermined, prioritized screening of incoming telephone calls, i.e., a called party can establish predetermined screening criteria which are used to determine which incoming telephone calls will ring through and which incoming telephone calls will be blocked or diverted. In accordance with the present invention, the selection criteria can be based on factors such as: call origination information, call origination information with wildcards, time, date, or a combination of these factors.

Such embodiments of the present invention are advantageous because a called party will receive predetermined incoming telephone calls without manual screening and without any perceived difference in prioritization to a calling party. Further, since prioritization is under the control of the called party, the prioritization criteria can change as the called party's needs change. As a result, a user's productivity increases by decreasing interruptions. This can be understood in light of the following two examples. First, assume that Skylar is waiting for a conference call to begin with Penny and the board of directors of King Aviation. Penny will be calling him at the appropriate time. Skylar uses "Priority Screening" so that only Penny's call will ring through and his telephone line does not get tied up with other calls. Second, assume that Anthony is working feverishly to put a product plan together to present to the company president later that day. He is expecting data to be transmitted to him by telephone from a branch in California. Since the two branches are linked by tie lines, he uses "Priority Screening" to allow only calls that come in on the tie lines to ring at his telephone.

Embodiments of a third aspect of the present invention advantageously satisfy the above-identified need in the art and provide method and apparatus for re-routing incoming telephone calls based on predetermined selection criteria such as, for example, call origination information, call origination information with wildcards, time, day, date, or a combination of the above factors. Advantageously, re-routing occurs automatically without interaction with a calling party or any other party.

BRIEF DESCRIPTION OF THE DRAWING

A complete understanding of the present invention may be gained by considering the following detailed description in conjunction with the accompanying drawing, in which.

DETAILED DESCRIPTION

Figure 1:
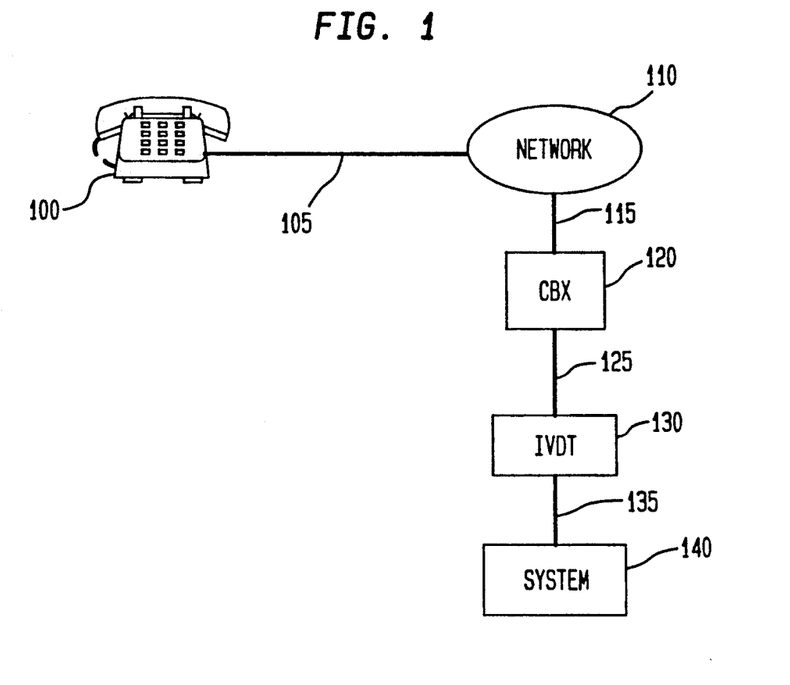
FIG. 1 is a block diagram which illustrates the manner in which an embodiment of the present invention is configured for use in a telephone environment.

FIG. 1 is a block diagram which illustrates the manner in which an embodiment of the present invention is configured for use in a telephone environment. As shown in FIG. 1, a calling party at telephone 100 places a telephone call which is transmitted over telephone line 105 to telephone network 110, for example, the public switched network ("PSTN"). The call is transmitted, in turn, over telephone line 115 to private business exchange 120, for example, 9751 CBX computerized switching machine 120 manufactured by ROLM Systems of Santa Clara, Calif. Lastly, the telephone call is transmitted over connecting link 125, for example, ROLMlink TM connecting link 125 manufactured by ROLM Systems of Santa Clara, Calif., to integrated voice data terminal IVDT 130, for example, ROLM TM Cypress TM IVDT 130 manufactured by ROLM Systems of Santa Clara, Calif. ROLM Cypress IVDT 130 is a personal communication terminal which also comprises an integrated digital telephone. IVDT 130 communicates with system 140 which will be described in further detail below.

Figure 2:
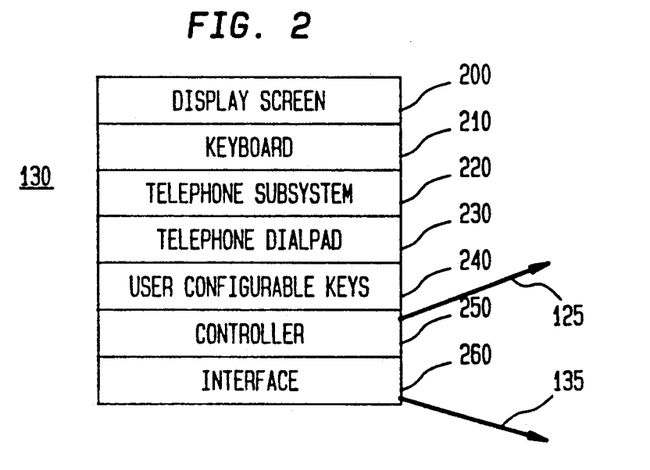
FIG. 2 is a block diagram of an integrated voice data terminal ("IVDT") which is used in fabricating an embodiment of the present invention.

FIG. 2 is a block diagram of IVDT 130 which is used to fabricate a preferred embodiment of the present invention. As shown in FIG. 2, IVDT 130 comprises: (a) display screen 200; (b) keyboard 210 which provides full ASCII input capability and which provides cursor control keys for use in conjunction with display screen 200; (c) telephone subsystem 220, including a receiver; (d) telephone dialpad 230 for use in conjunction with telephone subsystem 220; (e) user configurable keys 240 for use in conjunction with telephone subsystem 220, for example, user configurable keys 240 comprise repeat dial keys, line keys, and telephone function keys such as, for example, HOLD, CONNECT, and TRANSFER keys; (f) controller 250 which interfaces link 125 and CBX 120 to provide control of the transmission of voice and data therebetween; and (g) interface 260, for example, an RS232-C serial port, for interfacing with system 140.

ROLMlink TM connecting link 125 is a single twisted pair of standard telephone wires which transmits digitized voice and data between CBX 120 and IVDT 130. CBX 120 comprises an interface (not shown) which converts analog voice signals into a digital data stream and which multiplexes this digital data stream with other digital signals and a telephone power signal into a signal which is transmitted over connecting link 125 to IVDT 130. Additionally, the interface in CBX 120 demultiplexes signals transmitted thereto over connecting link 125 from IVDT 130 into a digital data stream which corresponds to voice signals and into a digital data stream that corresponds to data signals. ROLMlink connecting link 125 operates at 256 Kbps where 64 Kbps is used to transmit digitized voice, 64 Kbps is used to transmit data, and the remaining 128 Kbps (64 Kbps for data control and 64 Kbps for voice control) is used to control signals, error detection signals and other signals which are not relevant here. CBX 120 provides switching of voice signals as well as switching of data signals.

In this embodiment, date and time may be supplied to IVDT 130 by CBX 120, which date and time are transmitted in turn to system 140. These data, along with all control information which is transmitted between IVDT 130 and CBX 120, are transmitted via a 128 Kbps data channel on ROLMLink 135. Alternatively, the date and time are generated at system 140 in a manner which is well known to those of ordinary skill in the art.

Although we will describe an embodiment of the present invention wherein IVDT 130 interacts directly with system 140 to update a database contained therein, the present invention is not restricted to such an embodiment wherein a database is comprised in a local system. In particular, in one example of an alternative embodiment, IVDT 130 interacts with a remote system to update a database contained in the remote system by using the data switching capability of CBX 120. In such an alternative embodiment, IVDT 130 places a data call to the remote system by transmitting the call over connecting link 125 to CBX 120. CBX 120, in turn, transmits the data call to a remote system, whether it be an on-premises system which interacts directly with CBX 120 or an off-premises system which interacts with CBX 120 through network 110. Notwithstanding whether the interaction between IVDT 130 and a system which is comprised of a database be by means of a direct interaction between IVDT 130 and system 140 by means of link 135 or by means of a remote interaction between IVDT 130 and a remote system, the logic of the interaction is much the same. As a result, for ease of understanding, the following describes the embodiment shown in FIG. 1 which comprises a direct interaction between IVDT 130 and system 140 over link 135. Having provided this description, it will be clear to those of ordinary skill in the art as to the manner in which such embodiments may be modified to operate by means of the remote interaction.

In either case, however, if IVDT 130 is embodied as, for example, a ROLM Cypress IVDT, database access may be simplified by the ability of a ROLM Cypress IVDT's ability to define and store terminal profiles and log-on sequences. For example, parameters such as data rate, parity, echoplex, terminal type, and log-on sequence may be generated and stored for a database so that database access may be accomplished by the issuance of a single command. This is useful in providing access to remote databases stored in mainframes, minicomputers, and public information services. Further, the ability of a ROLM Cypress IVDT to store and implement personal communications software (PCS) provides easy access to a remote database and, once a connection is made thereto, PCS makes possible rapid access to data files.

Figure 3:
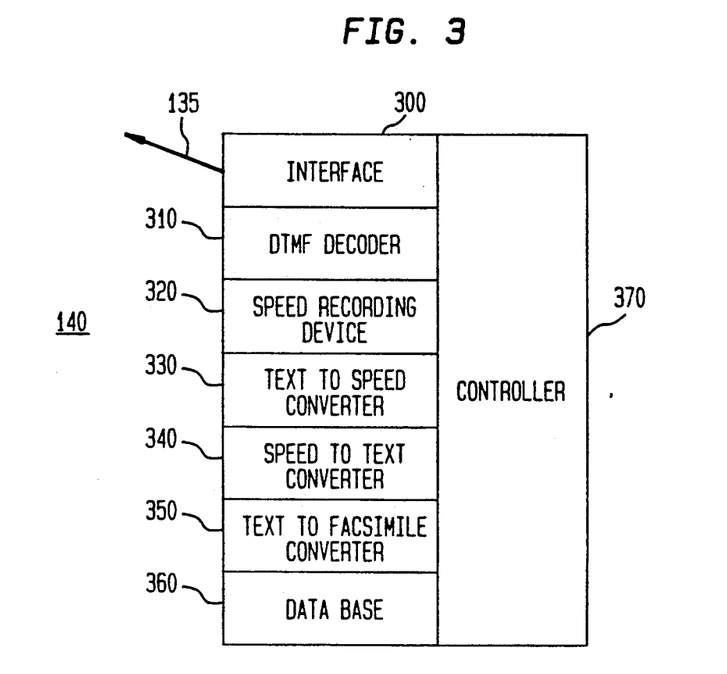
FIG. 3 is a block diagram of a system which is used, in conjunction with the IVDT shown in FIG. 2, in fabricating an embodiment of the present invention.

As shown in FIG. 3, system 140 comprises: (a) interface 300; (b) DTMF decoder 310; (c) speech recording device 320; (d) text to speech converter 330; (e) speech to text converter 340; (f) text to facsimile converter 350; (g) database 360; and (h) controller 370. Interface 300 is apparatus for interfacing link 135 and system 140 which is well known to those of ordinary skill in the art; DTMF decoder 310 is apparatus for receiving and decoding dual tone multifrequency signals which is commercially available and which is well known to those of ordinary skill in the art; speech recording device 320 is apparatus for converting speech signal to a digital representation for storage in a database which is commercially available and which is well known to those of ordinary skill in the art; text to speech converter 330 is apparatus for transforming text into speech which is commercially available and which is well known to those of ordinary skill in the art; speech to text converter 340 is apparatus for transforming speech to text which is commercially available and which is well known to those of ordinary skill in the art; text to facsimile converter 350 is apparatus for transforming text into facsimile compatible data which is commercially available and which is well known to those of ordinary skill in the art; database 360 is stored on storage means such as magnetic disk storage which is well known to those of ordinary skill in the art; and controller 370 is apparatus for guiding the interaction of the portions of system 140 and its interaction with IVDT 130 in a manner which will be explained in detail below. Controller 370 may be a microprocessor such as an IBM PS/2 personal computer which is manufactured by International Business Machines Corporation.

The operation of the embodiment of the inventive message delivery system for delivering predetermined messages to incoming telephone calls, for prioritorized screening of incoming telephone calls, and for re-routing incoming telephone calls will now be described in general in accordance with a description of the following functions thereof: (a) determining predetermined selection criteria, developing predetermined messages, and assigning the predetermined messages to the predetermined selection criteria; (b) delivering the messages; (c) determining predetermined selection criteria and assigning priority screens to the predetermined selection criteria; (d) screening the incoming telephone calls; (e) determining predetermined selection criteria and assigning re-routing to the predetermined selection criteria; and (g) re-routing incoming telephone calls. Those of ordinary skill in the art will realize that, when the description relates to the delivery of voice messages, the inventive method and apparatus can also be applied to the creation and delivery of text messages to a terminal such as, for example, a display phone, an IVDT, the combination of a telephone device and a computer such as a personal computer, or a facsimile apparatus whenever a call is received from one of these devices or from an associated device or terminal. Further, those of ordinary skill in the art will realize that, although we are describing predetermined selection criteria on the basis of calling party origination information, the inventive method and apparatus can also be applied to predetermined selection criteria which relates to any combination of time, date, call origination information, and so forth.

In general, a called party uses an embodiment of the invention for determining predetermined selection criteria. This is done by means of an interactive system which allows a user to input data into a database to define a set of criteria, including but not limited to call origination information, for use in dealing with an incoming telephone call by identifying a predetermined calling party or group of calling parties. Call origination information comprises, but is not limited to, ANI, Private Network Tie Line Identification, Trunk ID, WATS Line, and internal extension. Further, the predetermined selection criteria may comprise all or groups of the following information: (a) call origination information; (b) time of call; (c) date of call; or (d) predetermined priority groupings. The criteria set up by the user by interaction with the preferred embodiment of the present invention may also contain wild cards in the call origination number. For example, if members of the Accounting Department all had extension numbers starting with 77, then the Priority Call Screening user could specify the criteria so that a call would ring through if the call origination =77**. In a preferred embodiment of the present invention, the database comprises the following information relating to a calling party: (a) name; (b) telephone number; and (c) a user assigned priority number, for use, for example, in prioritorized screening.

Then, predetermined messages, priorities, or re-routings are associated with the predetermined selection criteria in the database for use in handling incoming telephone calls. We will now discuss a few simple examples of database information to help illustrate the general discussion.

In a first example associated with the delivery of predetermined messages, assume that Bruce Wayne takes an emergency leave of absence from his duties as CEO of Gotham City Industries. He uses an embodiment of the present invention to set up message delivery as follows:

---
Call Origination message for incoming calls from 445-6545:
"Albert, please pick up my cape from the cleaners."
Call Origination message for incoming calls from 763-5555:
"Robin, meet me at the waterfront and bring the batmobile"
Call Origination message for incoming calls from extensions 75**:
"To my staff, I will be out of the office for an undetermined amount of time. Please see Commissioner Gordon if you have any questions."

---

In a second example associated with the delivery of predetermined messages for use, for example, in the insurance industry, a message is provided automatically to customers who call to get status information on claims. For example, when a customer calls, she is identified by ANI, and a personal message is delivered to her: "Hellow, Ms. Lane. Your check was mailed on Wednesday." Or, when Mr. Kent calls, he is identified by ANI, and a personal message is delivered to him: "Hello, Mr. Kent. We need some additional information in order to process your claim. After the tone, please state your wife's, mother's, maiden name."

In a third example associated with the delivery of predetermined messages, a television cable company uses an embodiment of the present invention to transmit specific information to predetermined customers. For example, assume that a customer calls the cable company from his home phone, 338-6542. Using wildcards, the cable company has previously interacted with the embodiment to required the system to provide the following message to callers in the 338 exchange: "We are sorry, but a cable is still down in your area. We are working to correct the problem. Thank you for your patience." Futher, the cable company might also require the system to transmit the following message to a particular customer: "Mr. Rogers the cable is out at your house. We stopped broadcasting your show because you have not paid your bill since April, 1990."

The following is an example of a portion of a database for use in selecting incoming telephone calls which have a high enough priority to be permitted to ring through:

| Priority | Telephone Number | Name |
|---|---|---|
| 2 | 7327 | Arledge, Cathy |
| 1 | 201-321-3023 | Eag, Barton |
| 8 | 608-925-5776 | Finkleheimer, Fred |
| 2 | 7075 | Ford, Gordon |
| 2 | 7079 | Rust, Tracy |
| 2 | 339-8147 | Rust, Tracy |
| 2 | 7218 | Wilson, Tim |

In conjunction with an interactive portion of the preferred embodiment of the present invention, the user is able to set up criteria for prioritizing calls which are also stored in the database. The following are examples of the manner in which the priority information may be used to screen calls:

> Ring call through if Priority = 1.
> Ring call through if Priority = 1 or Priority = 2 and time of call is between 9:00 AM and 5:00 PM.
> Ring call through if call origination telephone number = 462-5646.
> Ring call through if the caller's name is Tracy Rust. (For this example, the processor would find a match in the database if the incoming call from Tracy came in on either 7079 or 339-8147, the two numbers listed for her in the database.)

In accordance with re-routing, after selecting predetermined selection criteria, a called party determines predetermined re-routing, i.e., transfer, targets. In accordance with a preferred embodiment, transfer targets may comprise any of the following: (a) an extension; (b) an off premises telephone number; or (c) a message taking service.

The following examples illustrate the manner in which a database associated with such an embodiment of the present invention is configured. In a first example, assume that Dr. Warner of Pine Valley Hospital will be taking a sabbatical this summer. There are three other doctors who will be taking his patients during his absence: (a) Dr. Hubbard at 453-7668; (b) Dr. Tyler at 678-3939; and (c) Dr. Martin at 222-3333. Dr. Warner divides up his patients among the three doctors and sets up a selective call re-routing entry in the database as follows.

| Incoming Call: | | Transfer to: |
|---|---|---|
| Name | Number | Target |
| Donna Sago | 454-9557 | 453-7668 |
| Palmer Courtlandt | 250-9596 | 453-7668 |
| Brooke English | 467-2839 | 222-3333 |
| Tom Cudahy | 785-2390 | 678-3939 |
| Travis Montgomery | 326-1928 | 678-3939 |
| Phoebe Wallingford | 454-1029 | 222-3333 |

In a second example, assume Peter Parker is a third shift foreman at Web Industries. Parker sets up a selective call re-routing entry in the database to transfer his incoming calls to the other foremen when it is not his shift. If the call is being transferred, but is not answered by the foreman, the call is transferred to a second target, the operator. Parker's selection criteria are based only on time and day of the week.

| Incoming Call: | | Transfer to: | |
|---|---|---|---|
| Time | Day | 1st Target | 2nd Target |
| 08:00 AM–04:00 PM | MTWTF | x5234 | xO |
| 08:00 AM–04:00 PM | SS | x5778 | xO |
| 04:00 PM–12:00 PM | MTWTF | x5890 | xO |
| 04:00 PM–12:00 AM | SS | x5203 | xO |
| 12:00 AM–08:00 AM | SS | x5839 | xO |

In describing embodiments of the present invention above, it was assumed that Automatic Number Identification ("ANI") was available for incoming telephone calls. If ANI is not available, call origination identification cannot be determined unless a switching machine provides other call origination information such as, for example, an extension for a telephone in a private business exchange (PBX). In another embodiment of the present invention, calling parties may be instructed to enter a Personal Identification Number ("PIN"), which PIN is used by the inventive apparatus in place of ANI in dealing with the incoming telephone call.

We now turn to describe the manner in which an embodiment of the present invention operates in detail in regard to determining predetermined selection criteria. Specifically, a user sends a message to system 140 that information is to be added, deleted, or changed in database 360 pertaining to sending messages, screening, or re-routing calls by interacting with IVDT 130. This interaction may take place by means of the user pressing user configurable keys 240, pressing predetermined sequences of keypads on dialpad 230, or by means of an interface utilizing keyboard 210.

Once controller 370 recognizes the request for such an interaction, the user is prompted to enter the appropriate information. This prompting may take the form of voice messages which are provided to the user, which voice messages are stored in database 360 or the prompting may take the form of text messages, which text messages are stored in database 360. Of course, those of ordinary skill in the art understand that software for controlling the interface between system 140 and IVDT 130 and the user may reside in memory modules which are contained within system 140, which memory modules may also contain the necessary prompting messages.

In various embodiments, the user may be prompted: (a) to enter the telephone number of a calling party; (b) to enter a time of day; (c) to enter certain dates; and so forth. For embodiments where the user interacts with a terminal such as IVDT 130 by means of text input, then the interaction would typically take place whereby the user receives information from system 140 on display screen 200 and inputs information to system 140 by using keyboard 210. However, it is within the spirit of the present invention that a user may interact by using a telephone and a telephone keypad. For such embodiments, system 140 provides output to the user by transmitting digital representations thereof to IVDT 130 which transmits the digital representations, in turn, as part of a telephone connection utilizing link 125 to the user. In response, the user would input information by using the telephone keypad. For example, a prompt might appear as follows: "Enter the telephone number of the calling party selected, use * as a wildcard." Note that for this example the character * was chosen for a wildcard because it can be entered from a telephone keypad or from an alphanumeric keypad and, as a result, maintains a reasonably uniform interface for users of either input device. Of course, those of ordinary skill in the art will realize that any symbol may be selected as to indicate a wildcard choice. Then, control is transferred to box 520 to await input from the user.

It should be clear to those of ordinary skill in the art that the interaction includes typical interactive mechanisms such that system 140 will wait for a predetermined amount of time for user input and, if none is received before that amount of time has expired, the interaction will be terminated. Of course, although it is not explicitly shown, as those of ordinary skill will recognize, any interaction between system 140 and the user may be terminated at any time by the user by entering a predetermined sequence of inputs or by pressing a function key which has been designated for this purpose.

If a user is entering a message to be supplied to predetermined incoming telephone calls: (a) for embodiments where the user interacts with a terminal such as IVDT 130 by means of text input, the user will input the message by text. The text will be converted to voice by text to speech converter 330 and stored in database 360 and (b) for embodiments where the user interacts with the system over a telephone, the user will provide a spoken message which will be received by speech recording device 320. Then, the digital representation will be stored in database 360.

If a user is entering information related to prioritorized screening, the user will input the predetermined selection criterion and the priority in text format using a keyboard like keyboard 210, in DTMF format using a dialpad like dialpad 230, in voice format by using a telephone system like telephone subsystem 220, and so forth. If the input is made by speech, the information is translated by speech to text converter 340 before it is stored in database 360.

If a user is entering information relating to re-routing information, the user will input the predetermined selection criteria and the priority in text format using a keyboard like keyboard 210, in DTMF format using a dialpad like dialpad 230, in voice format by using a telephone system like telephone subsystem 220, and so forth. If the input is made by speech, the information is translated by speech to text converter 340 before it is stored in database 360.

Further, it should be clear to those of ordinary skill in the art as to how data may be altered or deleted from database 360 in a manner which is similar to that described above for adding data.

With the above-described method and apparatus for determining predetermined selection criteria and entering messages, priorities, and re-routing, in mind, attention is now turned to an embodiment of the present invention for providing the messages to, for screening, and for re-routing incoming telephone calls.

In particular, when an incoming telephone call is received by IVDT 130, controller 250 interrogates link 125 to obtain call origination information. System 140 polls IVDT 130 and requests the call origination information. This information is transferred by interface 260 to interface 300 over link 135. Controller 370 interrogates database 360 using the call origination information as a retrieval key. Then, controller 370 compares the call origination information with the predetermined selection criteria which are stored in the database to determine the proper course of action, i.e., to determine whether to provide a message, to accept or block the call, or to re-route the call.

In order to send a personalized message to the calling party, the call origination information must match an incoming telephone number that is specified in the database to receive personalized messages. In addition, any time and date conditions which are contained in a database record must also be satisfied. As set forth above, in this embodiment, the time and date information is periodically transmitted to IVDT 130 from CBX 120 and is relayed, in turn, to system 140 on request thereby. If the incoming telephone number is thusly designated, the message is retrieved from database 360 along with information specifying the mode of message transmittal. If the mode of message transmittal is voice, then a digital representation of the voice message is sent to IVDT 130 over link 135 for transmittal to the calling party over link 125. Further, if the mode of message transmittal is text, the message is converted to text if it was stored as voice by speech to text converter 340. However, there is no conversion if the message was originally stored as text. Then, the text data is transmitted to IVDT 130 over link 135 for transmittal to the calling party over the data portion of link 125. Still further, if the mode of message transmittal is facsimile, the message is converted to facsimile data if it was stored as voice by speech to text converter 340 and text to facsimile converter 350. However, there is no conversion if the message was originally stored as text. Then, the facsimile data is transmitted to IVDT 130 over link 135 for transmittal to a terminal specified in database 360 over link 125.

In order to permit the incoming call to ring through, the call origination information must match an incoming telephone number that is specified in the database as a number to ring through or the call origination information must match an entry in the database that has a priority number or name that is specified to be allowed to ring through. In addition, any time and date conditions which are contained in a database record must also be satisfied. If the incoming telephone number is thusly designated, controller 370 sends a signal to IVDT 130 over link 135 to cause IVDT 130 to allow the call to ring through to telephone subsystem 220. However, if the incoming telephone call does not satisfy any of the predetermined selection criteria, it will be blocked in accordance with methods which are well known to those of ordinary skill in the art. For example, system 140 will send a message to IVDT 130 to cause it to transmit a message to CBX 120 so that: (a) the calling party receives a busy tone; (b) the call is transferred to a message center or secretary; or (c) the calling party is transferred to a voice message system such as ROLM's Phonemail voice messaging system.

In order to re-route an incoming telephone call, the call origination information must match an incoming telephone number that is specified in the database as a number to re-route. In addition, any time and date conditions which are contained in a database record must also be satisfied. If the incoming telephone number is thusly designated, controller 370 sends a signal to IVDT 130 over link 135 to cause IVDT 130 to transfer the incoming telephone call to another telephone number retrieved from the database.

Those skilled in the art recognize that further embodiments of the present invention may be made without departing from its teachings. For example, embodiments of the present invention for providing unique messages to incoming telephone calls may utilize: (a) an answering machine like device instead of a database for storing messages; (b) a PC with a voice card and special hardware for speech capture; or (c) an extension to a voice messaging system. Further, embodiments of the present invention may, instead of an IVDT, utilize: (a) a personal computer and a ROLM Systems RP244PC digital telephone; (b) a personal Computer, a modem, and an apparatus for display of calling party ID, i.e., a CPID box; (c) a personal computer and an ISDN card; and so forth.

What is claimed is:

1. Apparatus for receiving a telephone call from a calling party apparatus, which telephone call is placed to a called party apparatus, the receiving apparatus, on the basis of predetermined selection criteria, for: (a) delivering predetermined messages to the calling party apparatus; (b) screening the telephone call from the calling party apparatus; or (c) re-routing the telephone call from the calling party apparatus, which receiving apparatus comprises:

interaction means for receiving the telephone call, for obtaining identification information relating to the calling party apparatus, for transferring the identification information to a processor means, and for receiving time and date from a switching machine;

the processor means, in response to the interaction means, for accessing a database means which has stored the predetermined selection criteria, predetermined messages, predetermined screening information, and predetermined re-routing information, the processor means using the identification information as a retrieval key for the predetermined selection criteria, and for using the predetermined selection criteria to determined whether to: (a) cause the interaction means to have the calling party apparatus connected with the called party apparatus; (b) provide predetermined message information to the calling party apparatus; (c) screen the telephone call from the calling party apparatus; or (d) re-route the telephone call from the calling party apparatus;

the processor means further comprising means for accessing the database means to obtain predetermined: (a) message information; (b) screening information; or (c) re-routing information; and the processor means further comprising means for interacting with the interaction means for causing the interaction means to: (a) cause the calling party apparatus to be connected to the called party apparatus; (b) provide the predetermined message information to the calling party apparatus; (c) cause the telephone call from the calling party apparatus to be screened; or (d) cause the telephone call from the calling party apparatus to be re-routed in accordance with the re-routing information.

2. The apparatus of claim 1 wherein the predetermined selection criteria comprise identification information, identification information with wildcards, time, data, or priority, or a combination of these factors.

3. The apparatus of claim 2 wherein the identification information comprises Automatic Number Identification, private tie line indemnification, trunk ID, Wide Area Telephone Service number, or extension number.

4. The apparatus of claim 1 wherein the interaction means provides the predetermined message information to the calling party apparatus by transmission of a voice message.

5. The apparatus of claim 1 wherein the interaction means provides the predetermined message information to the calling party apparatus by transmission of a text message to a calling party text display apparatus.

6. The apparatus of claim 1 wherein the interaction means provides the predetermined message information to the calling party apparatus by transmission of a facsimile message to a calling party facsimile receiving apparatus.

7. The apparatus of claim 1 wherein the interaction means blocks a telephone call from the calling party apparatus when none of the predetermined selection criteria are satisfied.

8. The apparatus of claim 1 wherein the interaction means re-routes the call by causing the call to be transferred to another called party apparatus in accordance with the predetermined rerouting information.

9. The apparatus of claim 1 wherein the interaction means comprises means for receiving the identification information from a telephone network.

10. The apparatus of claim 1 wherein the interaction means comprises means for sending messages retrieved by the processor means to the calling party apparatus and for detecting calling party responses.

11. A method for receiving a telephone call from a calling parry apparatus, which telephone call is placed to a called party apparatus, and, on the basis of predetermined selection criteria, for: (a) delivering predetermined messages to the calling party apparatus; (b) screening the telephone call from the calling party apparatus; or (c) re-routing the telephone call from the calling party apparatus, which method comprises the steps of:

receiving the telephone call and obtaining identification information relating to the calling party apparatus;

receiving time and date from a switching machine;

accessing a database means which has stored predetermined selection criteria, predetermined messages, predetermined screening information, and predetermined rerouting information, the step of accessing using the identification information as a retrieval key for the predetermined selection criteria, and using the predetermined selection criteria to determine whether to : (a) cause the calling party apparatus to be connected with the called party apparatus; (b) provide a predetermined message to the calling party apparatus; (c) screen the telephone call from the calling party apparatus; or (d) re-route the telephone call from the calling party apparatus;

accessing the database means to obtain: (a) message information; (b) screening information; or (c) re-routing information; and (a) causing the calling party apparatus to be connected with the calling party apparatus; (b) providing the predetermined message information to the calling party apparatus; (c) causing the telephone call from the calling party apparatus to be screened; or (d) causing the telephone call from the calling party apparatus to be re-routed in accordance with the re-routing information.

12. Apparatus for receiving a telephone call from a calling party apparatus, which telephone call is placed to a called party apparatus, the receiving apparatus, on the basis of predetermined selection criteria, for: (a) delivering predetermined messages to the calling party apparatus; (b) screening the telephone call from the calling party apparatus; or (c) re-routing the telephone call from the calling party apparatus, which receiving apparatus comprises:

interaction means for receiving the telephone call, for obtaining identification information relating to the calling party apparatus, and for transferring the identification information to a processor means;

the processor means, in response to the interaction means, for accessing a database means which has stored the predetermined selection criteria, predetermined messages, predetermined screening information, and predetermined re-routing information, the processor means fusing the identification information as a retrieval key for the predetermined selection criteria, and for using the predetermined selection criteria to determined whether to: (a) cause the interaction means to have the calling party apparatus connected with the called party apparatus; (b) provide predetermined message information to the calling party apparatus; (c) screen the telephone call from the calling party apparatus; or (d) re-route the telephone call from the calling party apparatus;

the processor means futher comprises means for accessing the database means to obtain predetermined: (a) message information; (b) screening information; or (c) re-routing information;

the processor means further comprising means for interacting with the interaction means for causing the interaction means to: (a) cause the calling party apparatus to be connected to the called party apparatus; (b) provide the predetermined message information to the calling party apparatus; (c) cause the telephone call from the calling party apparatus to be screened; or (d) cause the telephone call from the calling party apparatus to be re-routed in accordance with the re-routing information;

the processor means futher comprising means for storing a message as a representation of a voice message, as a representation of a text message, or as a representation of a facsimile message and the processor means still futher comprising means for:

(a) converting a message stored as a representation of a voice message into a representation of a text message or a representation of a facsimile message;

(b) converting a message stored as a representation of a text message into a representation of a voice message or a representation of a facsimile message; and (c) converting a message stored as a representation of a facsimile message into a representation of a text message or a representation of a voice message.

13. The apparatus to claim 12 wherein: (a) a predetermined message is stored as a representation of a voice message; (b) the processor means converts the message to a representation of a text message; and (c) the interaction means provides the predetermined message information to the calling party apparatus by transmission of a text message.

14. The apparatus of claim 12 wherein: (a) a predetermined message is stored as a representation of a voice message; (b) the processor means converts the message to a representation of a facsimile message; and (c) the interaction means provides the predetermined message information to the calling party apparatus by transmission of a facsimile message.

15. The apparatus of claim 12 wherein: (a) a predetermined message is stored as a representation of a text message; (b) the processor means converts the message to a representation of a voice message; and (c) the interaction means provides the predetermined message information to the calling party apparatus by transmission of a voice message.

16. The apparatus of claim 12 wherein: (a) a predetermined message is stored as a representation of a text message; (b) the processor means converts the message to a representation of a facsimile message; and (c) the interaction means provides the predetermined message information to the calling party apparatus by transmission of a facsimile message.

17. The apparatus of claim 12 wherein: (a) a predetermined message is stored as a representation of a facsimile message; (b) the processor means converts the message to a representation of a voice message; and (c) the interaction means provides the predetermined message information to the calling party apparatus by transmission of a voice message.

18. The apparatus of claim 12 wherein: (a) a predetermined message is stored as a representation of a facsimile message; (b) the processor means converts the message to a representation of a text message; and (c) the interaction means provides the predetermined message information to the calling party apparatus by transmission of a text message.

* * * * *